Nov. 23, 1926.  
P. B. HUNT  
1,608,123  
DIFFERENTIAL CURE VULCANIZING APPARATUS  
Filed Feb. 11, 1925    4 Sheets-Sheet 4
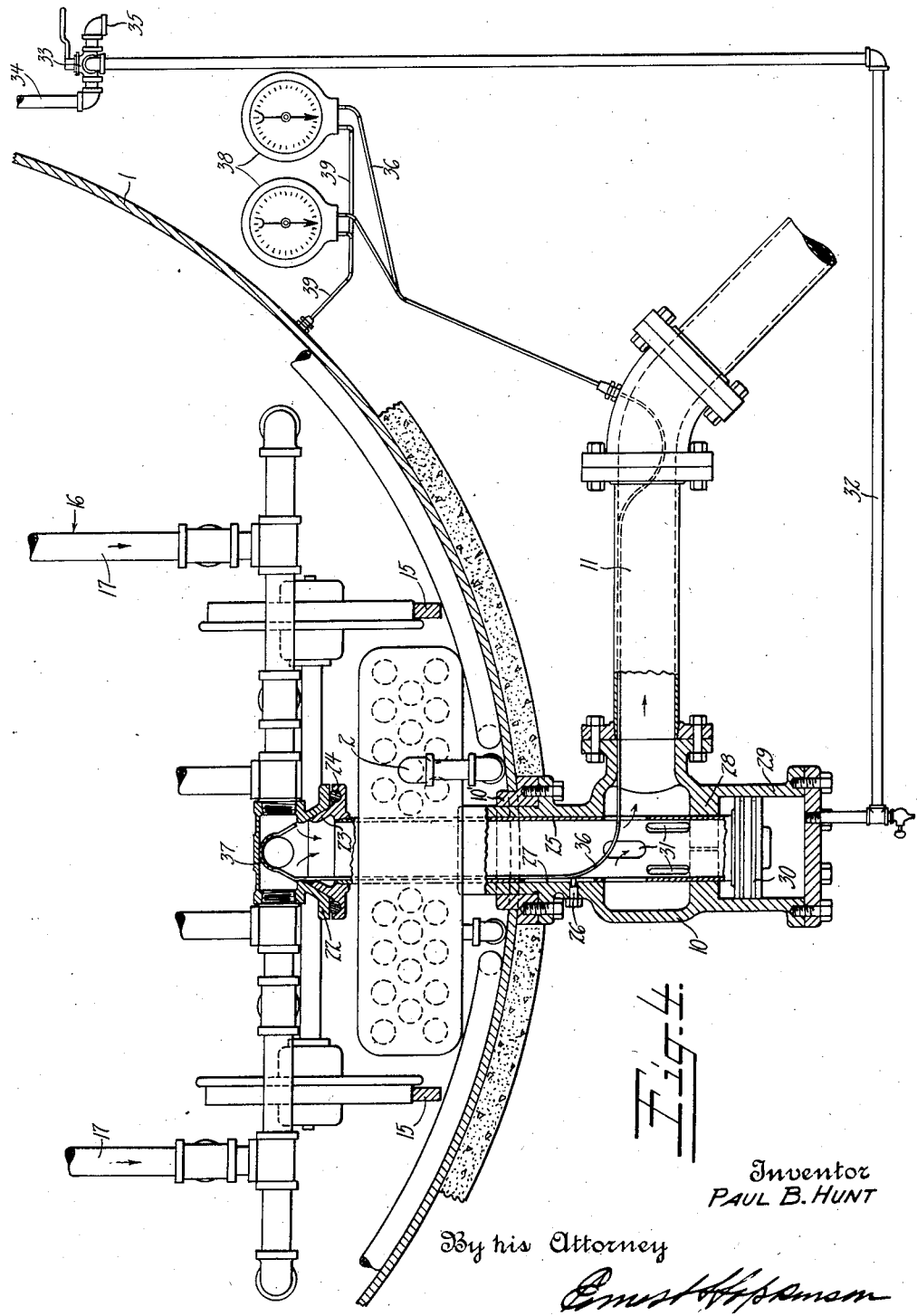
Inventor  
PAUL B. HUNT  
By his Attorney

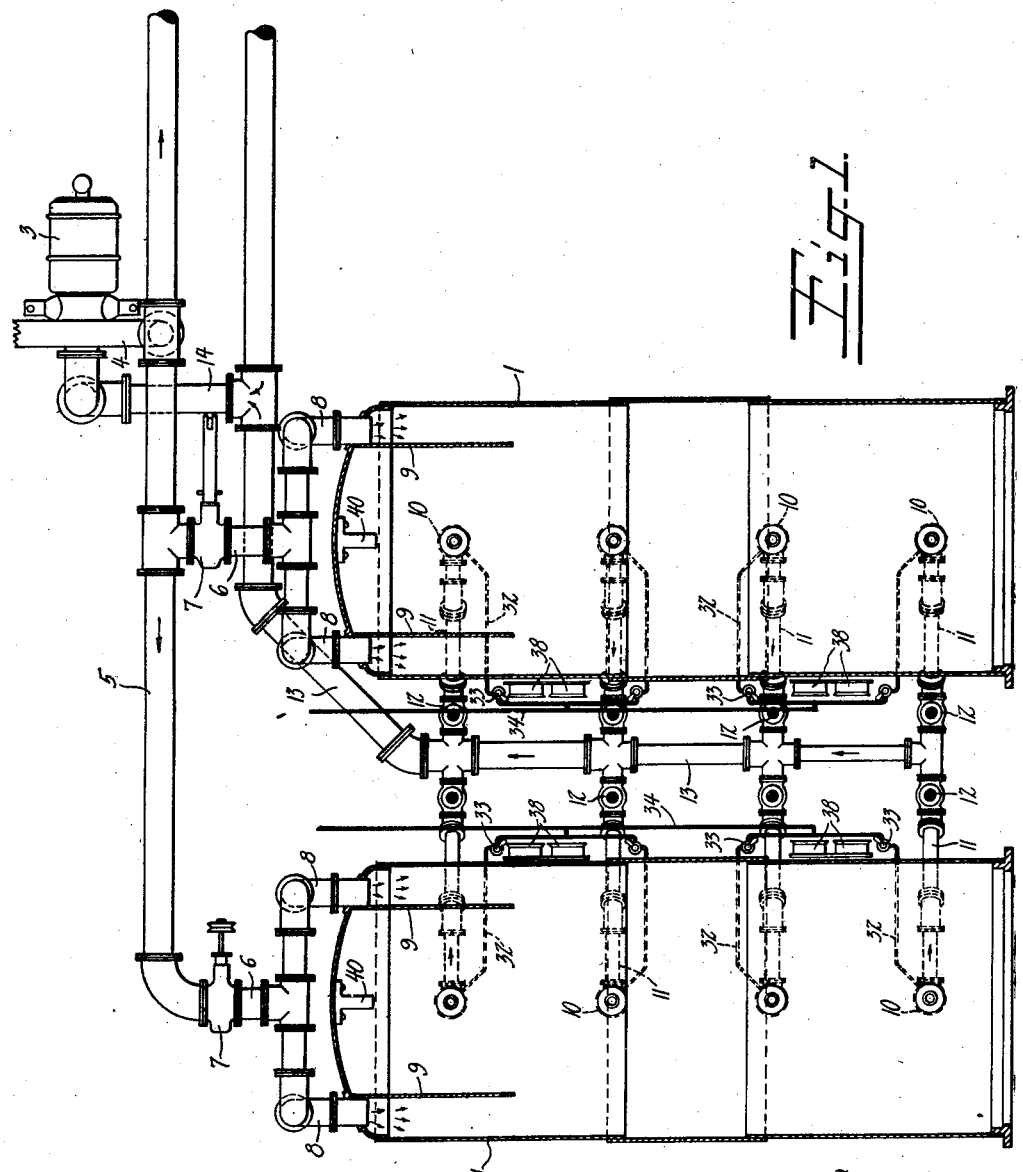

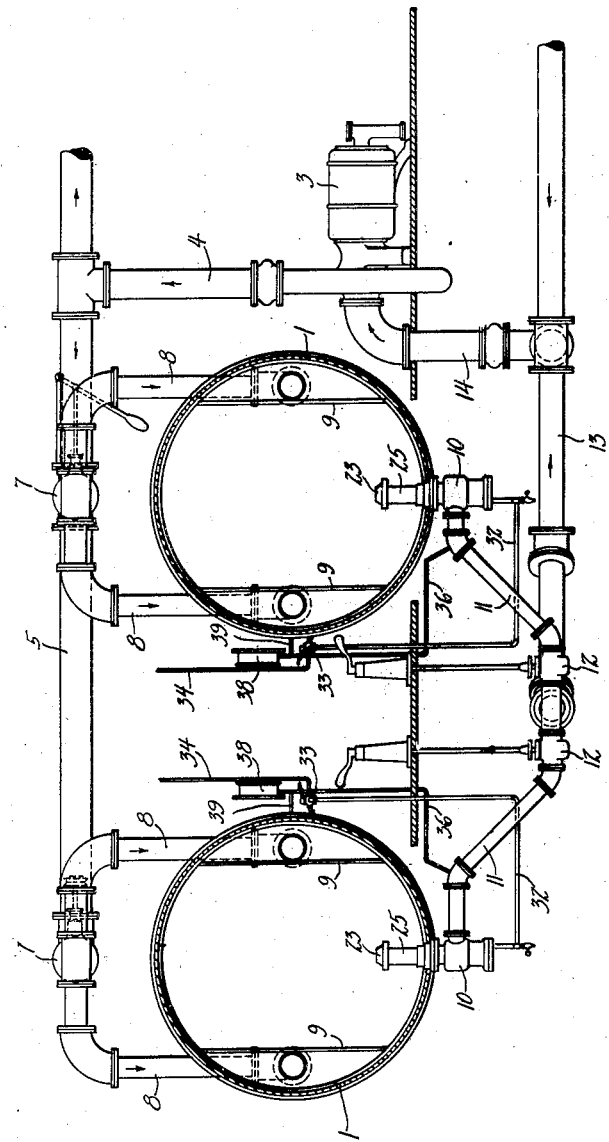

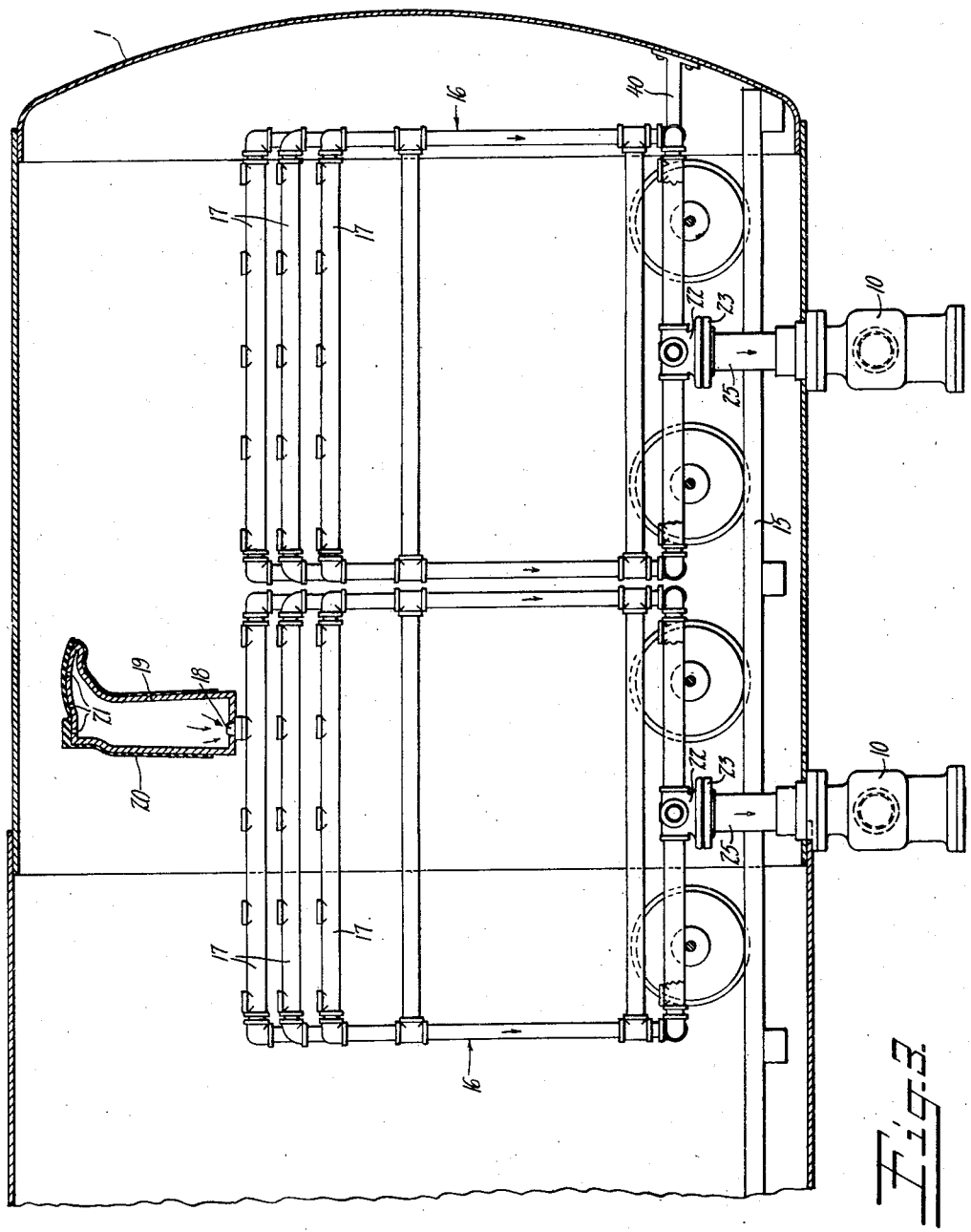

Patented Nov. 23, 1926.

1,608,123

UNITED STATES PATENT OFFICE.

PAUL B. HUNT, OF HAMDEN, CONNECTICUT, ASSIGNOR TO THE NAUGATUCK CHEMICAL COMPANY, OF NAUGATUCK, CONNECTICUT, A CORPORATION OF CONNECTICUT.

DIFFERENTIAL-CURE-VULCANIZING APPARATUS.

Application filed February 11, 1925. Serial No. 8,353.

This invention relates to a differential cure vulcanizing apparatus, more particularly to improvements in the means for applying the differential.

In the manufacture of rubber footwear articles, such as boots, the article is built up on a last by superposing the various plies thereon and hand rolling to compact and unite the plies. As the strength and durability of the finished article depend to a great extent on the complete union of the plies or parts at all points, considerable care must be exercised in rolling the parts together to avoid the formation of blisters or air bubbles in the finished product. In recent years the formerly used open heat method of curing footwear articles has been largely superseded by the so-called "differential cure" method. In using this method a footwear article is built up on the last or tree as before, but the last is made hollow and its interior is in communication, usually along the sole portion, with the interior of the built-up article. These lasts with the footwear article thereon are supported on hollow racks carried on cars and placed in the vulcanizer, the interior of the racks being in communication with the interior of the last, and the differential pressure is applied, usually by suction on the interior of the last and a positive pressure on the exterior of the article. This differential pressure is not applied until the heat has reached a point sufficient to soften the article, and in consequence any air bubbles contained between the plies or gases generated in the cure are removed, with the result that a finished article is produced, the plies of which are in intimate contact and union at all points, and by reason of this a considerable reduction in the labor and care required in building up the article is effected and a more uniformly perfect finished product obtained. However, prior to my invention it has been necessary to enter the vulcanizer in order to make the connection between each car of goods and the low pressure line by which a suction is created on the interior of the articles on the car. If the vulcanizers are being continuously used considerable physical discomfort is caused the operator in entering the heated vulcanizer after one heat to make the connections for the succeeding one. Moreover if through carelessness or otherwise he should fail to connect one of the cars to the low pressure line there is no way to determine this after the vulcanizer has been closed. Differential pressure gauges have been used to determine the differential between the interior of the vulcanizer and the low pressure line, but as the low pressure side of such gauges has previously been connected merely to the low pressure line at some point the gauge as a result merely indicates the average differential existing between the interiors and the exteriors of all the footwear articles in the vulcanizer. As the various lasts or trees are supported on the racks merely by a socket on the last fitting over a nipple on the rack there is considerable leakage which may vary between the racks of different cars, and differences in the permeability of the linings and various other conditions may cause considerable differences in the differential exerted at different cars.

An object of my invention is to provide an improved differential cure vulcanizer.

Another object is to provide a differential cure vulcanizer in which the connection for applying the differential to the various cars of goods within the vulcanizer may be rapidly and exteriorly effected.

Another object is to provide a means for exteriorly determining whether or not the differential connection has been made with each car.

Still another object is to provide a differential cure vulcanizer in which the differential applied to each car of goods can be accurately determined and regulated.

For a detailed disclosure of the nature and objects of the invention reference is had to the accompanying specification and drawings, in which latter—

Fig. 1 is a horizontal section through a series of vulcanizers embodying my invention, with parts omitted for the sake of clearness;

Fig. 2 is a transverse vertical section through the vulcanizers adjacent the inlet ends thereof, and with parts also omitted.

Fig. 3 is a broken-away enlarged longitudinal vertical section through a vulcanizer, showing the cars of footwear articles in position for the application of the differential thereto; and Fig. 4 is an enlarged detail section illustrating the manner of applying the differential.

Referring to the drawings, more particularly Figures 1 and 2, the numeral 1 designates vulcanizers in series, but two of which are shown in the present disclosure. These vulcanizers may be heated in any suitable manner as by means of the steam coils 2 (see Fig. 4). As a means for applying the differential and also for securing a circulation in the vulcanizers to provide an even temperature throughout their extent a pump 3 is provided, which may be of any constant pressure variable volume type. The outlet of this pump is connected by a pipe 4 to a main 5, which latter is provided at intervals along its length with the branch pipes 6 controlled by valves 7. Each branch pipe 6 in turn leads into the branches 8 which discharge into the rear or inner end of a vulcanizer 1, and to prevent the incoming current from impinging directly on the adjacent car of goods a baffle plate 9 is disposed at the outlet of each branch 8. In order to provide an exhaust from the vulcanizer a series of exhaust casings 10 is disposed along the bottom of the vulcanizer, which casings communicate with the interior thereof in a manner to be later described. As it is desirable that these casings be readily removable and as they are preferably made of cast iron they are bolted to steel flanges 10' which in turn are welded to the steel casing of the vulcanizer (Fig. 4). Each casing 10 is connected to an exhaust pipe 11 having interposed therein a valve 12, the exhaust pipes from an adjacent pair of vulcanizers all leading into an exhaust main 13 which is connected by a pipe 14 with the inlet side of pump 3.

Referring to Figures 3 and 4, each vulcanizer is provided with tracks 15 by which the cars 16 carrying the articles to be vulcanized may be rolled into the vulcanizer. These cars may be of any of the common types used in differential cure vulcanizing apparatus and consist ordinarily of a series of pipe racks 17 all of which are in communication with each other interiorly, each rack carrying at its upper side series of tapered nipples 18 over which hollow lasts or trees 19 carrying the footwear articles 20 may be disposed. It will be noted from Figure 3 that the lasts of trees 19 are provided with perforations 21 by which the interior of the last is placed in communication with the interior of the footwear article 20. Disposed at the bottom of each car is a flanged nipple 22 having a tapered or conical recess or opening therein in communication with all of the pipe racks of the car. Adapted to interfit with the recess of each nipple 22 is a flanged nipple 23 provided with a sealing ring 24, this nipple being carried at the upper end of an exhaust tube 25 slidably mounted in the exhaust casing 10, and in order to prevent rotary movement of the tube a pin 26 is secured in the casing, the end of which is disposed in a vertical slot 27 in the tube. Across the casing 10 is disposed a diaphragm 28 through which the tube 25 extends and is slidable therein, and the casing 10 is extended below this diaphragm to form a cylinder 29. Movable in this cylinder is a piston 30 secured to and closing the lower end of tube 25. Some distance above the piston 30 the tube 25 is provided with openings 31 by which its interior is placed in communication with the interior of the exhaust casing 10 and exhaust pipe 11. Communicating with the bottom of the interior of the cylinder 29 below the piston 30 is a pipe 32 having interposed therein an ordinary form of three way valve 33, by means of which it may be either placed in communication with a high pressure air line 34 or with the atmosphere at 35.

Disposed in the tube 25 is a small pipe 36, which may be made of flexible metal, the upper free end of which pipe is arched over and perforated as shown at 37. It will be noted from Figure 4 that this upper free end of the pipe 36 extends above the nipple 23 and is disposed entirely within the hollow interior of the car 16 when the nipples 22 and 23 are in engagement. The pipe 36 extends through the pipe 11 and out through the wall thereof to a connection with a pressure differential gauge 38, to which gauge is also connected a pipe 39 leading into the interior of the vulcanizer. A gauge 38 is provided for each exhaust tube 25, and the gauges for adjacent tubes are mounted in pairs as shown in Fig. 1. In order to approximately position the innermost car over its corresponding exhaust tube 25 the car may engage the inner wall of the vulcanizer in any desired manner, either directly or by means of a stop such as the stop 40 shown in Figures 1 and 3.

In operation the cars carrying the boot trees 19 and boots 20 are rolled in on the tracks 15 until the inner car has been brought to a stop by contact with the end wall of the vulcanizer or the stop 40 as before described, thus approximately centering each car over its corresponding exhaust tube 25, and the vulcanizers are then closed. The heat is turned on and the pump 3 started to circulate the gaseous medium in the vulcanizers, which latter may be air, carbon dioxide, or any other inert gaseous medium. The gaseous medium then flows from the pump and enters the vulcanizer through the branches 8 and is exhausted from the vulcanizer through the tubes 25 and returned to the pump. In this manner there is a circulation in the vulcanizer, resulting in an even temperature throughout and avoiding the formation of cool spots which would cause an uneven vulcanization. The differential is applied for only a limited period, say five to thirty minutes, and usually not until the heat has been raised to a temperature sufficient to soften the stock, for instance about 240° F. When the desired temperature has been reached the three way valve 33 is turned to connect the high pressure line 34 with the pipe 32 and to admit to the latter air at about 60 lbs. pressure. This air entering the cylinder 29 forces up the piston 30, thereby raising the tube 25 and nipple 23. The latter engaging the conical recess in the nipple 22 centers and rigidly holds the car 16 in position, and the sealing ring 24 causes a tight joint to be made between the two nipples. Due to the suction of the pump 3 a differential pressure is then created between the interior of the racks 17 on the car and hence the interior of each last 19 and footwear article 20, and the interior of the vulcanizer. Ordinarily, the pressure in the interior of the vulcanizer is maintained by the pump 3 at about 30 lbs. while the pressure within the footwear articles and cars 16 is kept at about 25 lbs. Due to leakage around the nipples 18 on which the footwear articles rest and leakage at various other points this differential tends, of course, to equalize, but is maintained by the pump 3. As each pressure gauge 38 is in communication with the interior of the vulcanizer by the pipe 39 and is also in direct communication with the interior of its corresponding car 16 by means of the pipe 36 and the perforated curved end 37 of the latter, it will be seen that the pressure gauge will directly indicate the pressure differential between the interior of the car with which it is connected and the interior of the vulcanizer, or substantially the differential existing at each footwear article.

By reason of the construction outlined it will be seen that the various cars after being run into the vulcanizer can be connected up to secure the differential without the necessity of the operator entering the vulcanizer, all that is necessary being to turn on the high pressure valve 33, which thereby forces up the tube 25 to both secure and centralize its corresponding car and to render effective the differential for that car. At the same time the pressure differential gauge 38 instead of merely indicating an average differential, as previously, indicates exactly the effective differential for the car with which it is connected and also shows that such connection has been made. Therefore by suitable regulation through the valves 7 and 12 a uniform differential can be applied to each car in the vulcanizer or in different vulcanizers. As the period of application of the differential is short while the complete cure requires several hours it will be seen that the pump 3 need not be made of a capacity sufficient to supply all of the vulcanizers simultaneously, as by suitable regulation of the valves the differential can be applied successively to different vulcanizers. When it is desired to cut off the differential all that is necessary is to turn the valve 33 for each car so as to place the pipe 32 in communication with the atmosphere at 35. Through leakage between the flanges 22 and 23 and at other points the pressure within the tube 25 then rapidly builds up to that existing in the interior of the vulcanizer and the piston 30 is forced downward, placing the tube 25 in direct communication with the interior of the vulcanizer. If desired the pump 3 and its circulating system may be used only for the application of the differential, without any circulation of the air or other gas during the balance of the cure.

Certain classes of goods require more differential than other classes, and if located in the same vulcanizer this differential is controlled by the amount of opening given by valves 12. Obviously if the class of goods in the vulcanizer all require the same differential, all valves 12 may be opened before differential is applied, and then by opening valve 7 all goods would receive the same differential.

It will be seen that by the use of my invention cars can be run into the vulcanizer, held in centered position therein, and the differential applied to each of them without the necessity of entering the vulcanizer, and by reason of the position of the free end of the pipe 36 the differential exerted at each car is indicated by the corresponding gauge 38, which latter at the same time also indicates that the connection has been made. My invention therefore increases the rapidity and ease with which the differential may be applied, insures that the differential is applied to each car, and also insures that the differential in each car is the same, thereby aiding in the production of goods of the greatest uniformity.

While a specific example of the invention has been illustrated and described, it is obvious that it is capable of modifications, and it is not desired to limit it otherwise than as set forth in the appended claims.

Having thus described my invention, what I claim and desire to protect by Letters Patent is:

1. In a differential cure vulcanizing apparatus, a vulcanizer, a hollow article carrying frame adapted to be disposed therein, exhaust means open to the interior of the vulcanizer, and exteriorly operable means for connecting the opening of the latter to the interior of said frame.

2. In a differential cure vulcanizing apparatus, a vulcanizer, a hollow article carrying frame adapted to be disposed therein, exhaust means open to the interior of the vulcanizer, and exteriorly operable pneumatic means for connecting the opening of the latter to the interior of said frame.

3. In a differential cure vulcanizing apparatus, a vulcanizer, a hollow article carrying frame adapted to be disposed therein, exhaust means, a slip joint connection between said last two elements, and exteriorly operable means for actuating said connection.

4. In a differential cure vulcanizing apparatus, a vulcanizer, a hollow article carrying frame adapted to be disposed therein and having an exhaust opening, a movable exhaust connection carried by the vulcanizer, and exteriorly operable means for moving said connection into operative relation to said opening.

5. In a differential cure vulcanizing apparatus, a vulcanizer, a hollow article carrying frame adapted to be disposed therein and having an exhaust opening, an exhaust pipe leading from the vulcanizer, an extension of said pipe adapted to be moved into registry with said opening, and exteriorly operable means for actuating said extension.

6. In a differential cure vulcanizing apparatus, a vulcanizer, a hollow article carrying frame adapted to be disposed therein and having an exhaust opening, an exhaust pipe extending into the vulcanizer and movable into and out of registry with said opening, fluid pressure means for actuating said pipe, and exhaust means communicating with said pipe.

7. In a differential cure vulcanizing apparatus, a vulcanizer, a hollow article carrying frame adapted to be disposed therein and having an exhaust opening, an exhaust pipe extending into the vulcanizer and movable into registry with said opening, exhaust means communicating with said pipe exteriorly of the vulcanizer, and exterior means for actuating said pipe.

8. In a differential cure vulcanizing apparatus, a vulcanizer, a hollow article carrying frame adapted to be disposed therein and having an exhaust opening, an exhaust pipe movable into and out of registry with said opening, a casing surrounding said pipe and communicating therewith, exhaust means connected to the casing, a piston carried by said pipe, a cylinder therefor carried by the casing, and means for supplying fluid under pressure to the cylinder.

9. In a differential cure vulcanizing apparatus, a vulcanizer, a hollow frame adapted to be disposed therein, means for mounting vulcanizable articles on said frame with their interiors in communication with the frame interior, means for maintaining fluid pressure within the vulcanizer, an exhaust pipe extending into the interior of the vulcanizer, and exteriorly operable means for connecting or disconnecting said pipe and frame.

10. In a differential cure vulcanizing apparatus, a vulcanizer, a hollow frame adapted to be disposed therein, means for mounting vulcanizable articles on said frame with their interiors in communication with the frame interior, means for maintaining fluid pressure within the vulcanizer, an exhaust pipe extending into the interior of the vulcanizer, and exteriorly operable pneumatic means for connecting or disconnecting said pipe and frame.

11. In a differential cure vulcanizing apparatus, a vulcanizer, a hollow article carrying frame adapted to be disposed therein and having an exhaust opening, an exhaust pipe movable into said opening, a conduit movable with said pipe and having an open end adapted to be disposed in said opening, and a pressure differential indicating device connected to the other end of said conduit.

12. In a differential cure vulcanizing apparatus, a vulcanizer, a hollow article carrying frame adapted to be disposed therein, means for creating a pressure differential between the exterior and interior of said frame, a pressure differential indicating device, and conduits leading therefrom to the interiors of the frame and vulcanizer.

13. In a differential cure vulcanizing apparatus, a vulcanizer, a hollow article carrying frame adapted to be disposed therein and having an exhaust opening, exhaust means connectible to said opening, a pressure differential indicating device, a conduit leading therefrom to the interior of the vulcanizer, a second conduit leading therefrom, and means whereby the inlet of the latter may be disposed within said exhaust opening.

14. In a differential cure vulcanizing apparatus, a vulcanizer, a hollow article carrying frame adapted to be disposed therein and having an exhaust opening, exhaust means movable into registry with said opening, a pressure differential indicating device, and means for automatically placing said indicating device in communication with the interior of the frame upon movement of said exhaust means.

15. In a differential cure vulcanizing apparatus, a vulcanizer, a hollow article carrying frame adapted to be disposed therein, exhaust means for said frame, a pressure differential indicating device, and means for simultaneously placing said exhaust means and indicating device in communication with the interior of said frame.

16. In a differential cure vulcanizing apparatus, a vulcanizer, a hollow article carrying frame adapted to be disposed therein, exhaust means for said frame, a pressure differential indicating device, and exteriorly operable pneumatic means for connecting said exhaust device and indicating means with the interior of said frame.

17. In a differential cure vulcanizing apparatus, a vulcanizer, a hollow article carrying frame adapted to be disposed therein, a circulatory system for maintaining a pressure differential between the interiors of the vulcanizer and frame, including means operable by the pressure in said system for rendering it inoperative, and exteriorly operable means for at will rendering it operative.

18. In a differential cure vulcanizing apparatus, a vulcanizer provided with tracks, a car adapted to run thereon and provided with a hollow article carrying frame, and an exteriorly operable member for fixedly holding and centering the car.

19. In a differential cure vulcanizing apparatus, a vulcanizer provided with tracks, a car adapted to run thereon and provided with a hollow article carrying frame, and an exteriorly operable member for fixedly holding and centering the car, said stop including means for exhausting gases from said frame.

20. In a differential cure vulcanizing apparatus, a vulcanizer, a hollow article carrying frame adapted to be disposed therein, a constant pressure variable volume pump having its outlet connected to said vulcanizer, and means operable exteriorly of the vulcanizer for connecting the inlet of said pump to the interior of said frame.

21. In a differential cure vulcanizing apparatus, a vulcanizer, a series of hollow article carrying frames adapted to be disposed therein, means for creating a pressure differential between the interiors of the frames and vulcanizer, and means adapted to extend into the frames for directly indicating the differential for each frame.

22. In a differential cure vulcanizing apparatus, a vulcanizer, a hollow article carrying frame adapted to be disposed therein, means for creating a pressure differential between the interiors of the vulcanizer and frame fixedly connected to the vulcanizer, a differential indicating means also fixedly connected thereto, and means exterior of the vulcanizer for simultaneously operatively connecting said last two means with the interior of said frame.

23. In a differential cure vulcanizing apparatus, a vulcanizer, a hollow article carrying frame adapted to be disposed therein, means for creating a pressure differential between the interior and exterior of said frame, and a pressure differential indicating device in direct communication with the interior of said frame.

Signed at New Haven, county of New Haven, State of Connecticut, this 4th day of February, 1925.

PAUL B. HUNT.